(12) United States Patent
Perry, II et al.

(10) Patent No.: US 8,966,549 B2
(45) Date of Patent: Feb. 24, 2015

(54) PROVIDING AND RECEIVING WIRELESS BROADCASTS

(71) Applicant: Syncbak, Inc., Marion, IA (US)

(72) Inventors: Jack F. Perry, II, Marion, IA (US); Steven C. Maher, Marion, IA (US)

(73) Assignee: Syncbak, Inc.

( * ) Notice: Subject to any disclaimer, the term of this patent is extended or adjusted under 35 U.S.C. 154(b) by 0 days.

(21) Appl. No.: 13/644,041

(22) Filed: Oct. 3, 2012

(65) Prior Publication Data

US 2014/0094110 A1 Apr. 3, 2014

(51) Int. Cl.
| | |
|---|---|
| *H04N 21/436* | (2011.01) |
| *H04N 21/4363* | (2011.01) |
| *H04N 7/10* | (2006.01) |
| *H04L 12/28* | (2006.01) |
| *H04N 21/462* | (2011.01) |

(52) U.S. Cl.
CPC ......... *H04N 21/43637* (2013.01); *H04N 7/106* (2013.01); *H04L 12/2801* (2013.01); *H04N 21/4622* (2013.01)
USPC .............................................. 725/81; 725/74

(58) Field of Classification Search
CPC ............ H04N 21/43637; H04N 7/106; H04N 12/2801; H04N 21/4622
USPC ...................................................... 725/81, 74
See application file for complete search history.

(56) References Cited

U.S. PATENT DOCUMENTS

| | | | |
|---|---|---|---|
| 5,835,128 A * | 11/1998 | Macdonald et al. ............ | 725/81 |
| 6,252,547 B1 | 6/2001 | Perry et al. | |
| 6,324,694 B1 | 11/2001 | Watts et al. | |
| 6,714,759 B2 | 3/2004 | Perry et al. | |
| 6,732,179 B1 | 5/2004 | Brown et al. | |
| 7,099,655 B2 | 8/2006 | Song et al. | |
| 7,502,832 B2 | 3/2009 | San Andres et al. | |
| 7,509,124 B2 | 3/2009 | O'Neil | |
| 7,600,120 B2 | 10/2009 | Monteiro et al. | |
| 7,676,219 B2 * | 3/2010 | Williams et al. ............. | 455/411 |
| 7,890,087 B2 | 2/2011 | O'Neil | |
| 8,081,957 B2 | 12/2011 | O'Neil | |
| 8,082,591 B2 | 12/2011 | Gu et al. | |
| 8,255,378 B2 | 8/2012 | Ji et al. | |
| 8,255,940 B2 | 8/2012 | Perry, II | |
| 8,255,941 B2 | 8/2012 | Perry, II | |

(Continued)

FOREIGN PATENT DOCUMENTS

| | | |
|---|---|---|
| CN | 1835641 A | 9/2006 |
| CN | 101626573 A | 1/2010 |

(Continued)

OTHER PUBLICATIONS

U.S. Appl. No. 61/444,415, filed Feb. 18, 2011.*

(Continued)

*Primary Examiner* — Nasser Goodarzi
*Assistant Examiner* — Michael B Pierorazio
(74) *Attorney, Agent, or Firm* — Alston & Bird LLP

(57) ABSTRACT

Systems, methods, apparatus, and computer program products are provided for wirelessly providing transcoded broadcasts to mobile devices and receiving content wirelessly via mobile devices. For example, in one embodiment, a distribution device can receive an over-the-air broadcast, transcode the over-the-air broadcast, and broadcast the transcoded broadcast to mobile devices within range.

30 Claims, 9 Drawing Sheets

(56) References Cited

U.S. PATENT DOCUMENTS

| | | | |
|---|---|---|---|
| 8,255,942 B2 | 8/2012 | Perry, II | |
| 8,255,943 B2 | 8/2012 | Perry, II | |
| 8,255,944 B2 | 8/2012 | Perry, II | |
| 8,255,945 B2 | 8/2012 | Perry, II | |
| 8,255,946 B2 | 8/2012 | Perry, II | |
| 8,255,947 B2 | 8/2012 | Perry, II | |
| 8,346,230 B2* | 1/2013 | Goodmon et al. | 455/414.3 |
| 8,370,872 B1 | 2/2013 | Sun et al. | |
| 8,423,004 B2* | 4/2013 | Goodmon et al. | 455/414.3 |
| 8,644,354 B2 | 2/2014 | George et al. | |
| 8,737,990 B2 | 5/2014 | Moreillon | |
| 2002/0183059 A1 | 12/2002 | Noreen et al. | |
| 2003/0097408 A1* | 5/2003 | Kageyama et al. | 709/205 |
| 2003/0233580 A1* | 12/2003 | Keeler et al. | 713/201 |
| 2004/0198217 A1 | 10/2004 | Lee et al. | |
| 2004/0261092 A1 | 12/2004 | Addington et al. | |
| 2005/0097593 A1* | 5/2005 | Raley et al. | 725/14 |
| 2006/0064734 A1* | 3/2006 | Ma | 725/136 |
| 2006/0253560 A1* | 11/2006 | Aaltonen | 709/223 |
| 2007/0067807 A1 | 3/2007 | O'Neil | |
| 2007/0107022 A1* | 5/2007 | Lawrence, III | 725/92 |
| 2007/0112935 A1 | 5/2007 | Espelien | |
| 2008/0060035 A1* | 3/2008 | Tsang et al. | 725/109 |
| 2008/0080408 A1 | 4/2008 | Gao | |
| 2008/0081640 A1 | 4/2008 | Tran et al. | |
| 2008/0120681 A1* | 5/2008 | Sibley | 725/136 |
| 2008/0184326 A1* | 7/2008 | Nakajima | 725/133 |
| 2008/0201225 A1* | 8/2008 | Maharajh et al. | 705/14 |
| 2008/0216107 A1* | 9/2008 | Downey et al. | 725/22 |
| 2008/0235733 A1* | 9/2008 | Heie et al. | 725/46 |
| 2008/0235743 A1* | 9/2008 | Walter et al. | 725/106 |
| 2008/0254739 A1 | 10/2008 | Kidd et al. | |
| 2008/0270725 A1* | 10/2008 | Roden et al. | 711/165 |
| 2008/0301736 A1 | 12/2008 | Heilbron et al. | |
| 2008/0307478 A1* | 12/2008 | Kim et al. | 725/114 |
| 2009/0113489 A1 | 4/2009 | O'Neil | |
| 2009/0125950 A1 | 5/2009 | Chaudhry et al. | |
| 2009/0165032 A1 | 6/2009 | Burke et al. | |
| 2009/0172784 A1 | 7/2009 | Park et al. | |
| 2009/0196267 A1 | 8/2009 | Walker, Sr. | |
| 2010/0100898 A1 | 4/2010 | Pfleging et al. | |
| 2010/0125511 A1 | 5/2010 | Jouret et al. | |
| 2010/0180305 A1* | 7/2010 | Migos | 725/45 |
| 2010/0199316 A1 | 8/2010 | Clarniello et al. | |
| 2010/0261485 A1 | 10/2010 | Fernandes | |
| 2010/0296487 A1* | 11/2010 | Karaoguz et al. | 370/332 |
| 2011/0086619 A1 | 4/2011 | George et al. | |
| 2011/0099587 A1 | 4/2011 | O'Neil | |
| 2011/0119595 A1* | 5/2011 | Bydeley et al. | 715/738 |
| 2011/0137592 A1* | 6/2011 | Kim et al. | 702/62 |
| 2011/0154383 A1 | 6/2011 | Hao et al. | |
| 2011/0196983 A1* | 8/2011 | Goodmon et al. | 709/231 |
| 2011/0219229 A1 | 9/2011 | Cholas et al. | |
| 2011/0279311 A1* | 11/2011 | Hamano | 342/357.25 |
| 2012/0064913 A1 | 3/2012 | Perry, II | |
| 2012/0066321 A1 | 3/2012 | Perry, II | |
| 2012/0127374 A1* | 5/2012 | Kanojia et al. | 348/731 |
| 2012/0196595 A1 | 8/2012 | Perry, II | |
| 2012/0196596 A1 | 8/2012 | Perry, II | |
| 2012/0266201 A1* | 10/2012 | Kanojia et al. | 725/109 |
| 2012/0317596 A1 | 12/2012 | O'Neil | |
| 2013/0053057 A1 | 2/2013 | Cansino et al. | |
| 2013/0227708 A1* | 8/2013 | Goodmon et al. | 726/27 |

FOREIGN PATENT DOCUMENTS

| | | |
|---|---|---|
| EP | 1898645 A1 | 3/2008 |
| EP | 2015576 A1 | 1/2009 |

OTHER PUBLICATIONS

United States Patent and Trademark Office, Office Action for U.S. Appl. No. 13/229,322, May 16, 2013, 15 pages, USA.
United States Patent and Trademark Office, Office Action for U.S. Appl. No. 13/229,376, Jun. 4, 2013, 8 pages, USA.
U.S. Appl. No. 13/361,275, filed Jan. 30, 2012, Perry, II, Jack F.
U.S. Appl. No. 13/547,831, filed Jul. 17, 2012, Perry, II, Jack F.
U.S. Appl. No. 13/547,934, filed Jul. 12, 2012, Perry, II, Jack F.
U.S. Appl. No. 13/644,107, filed Oct. 3, 2012, Perry, II, Jack F.
United States Patent and Trademark Office, Office Action for U.S. Appl. No. 13/361,275, filed Mar. 1, 2013, 19 pages, USA.
United States Patent & Trademark Office, Office Action for U.S. Appl. No. 13/288,359, Apr. 5, 2013, 13 pages, USA.
United States Patent & Trademark Office, Office Action for U.S. Appl. No. 13/288,364, Apr. 5, 2013, 14 pages, USA.
United States Patent & Trademark Office, Office Action for U.S. Appl. No. 13/547,831, Apr. 11, 2013, 14 pages, USA.
United States Patent & Trademark Office, Office Action for U.S. Appl. No. 13/547,934, Apr. 10, 2013, 15 pages, USA.
United States Patent and Trademark Office, Notice of Allowance for U.S. Appl. No. 12/784,777, dated Apr. 23, 2012, 14 pages, USA.
United States Patent and Trademark Office, Notice of Allowance for U.S. Appl. No. 12/784,783, dated Apr. 23, 2012, 14 pages, USA.
United States Patent and Trademark Office, Notice of Allowance for U.S. Appl. No. 12/784,785, dated Apr. 23, 2012, 14 pages, USA.
United States Patent and Trademark Office, Notice of Allowance for U.S. Appl. No. 12/784,791, dated Apr. 23, 2012, 14 pages, USA.
United States Patent and Trademark Office, Notice of Allowance for U.S. Appl. No. 12/872,595, dated Apr. 27, 2012, 13 pages, USA.
United States Patent and Trademark Office, Notice of Allowance for U.S. Appl. No. 12/872,681, dated May 1, 2012, 13 pages, USA.
United States Patent and Trademark Office, Notice of Allowance for U.S. Appl. No. 12/872,757, dated Apr. 27, 2012, 12 pages, USA.
United States Patent and Trademark Office, Notice of Allowance for U.S. Appl. No. 12/872,799, dated Apr. 27, 2012, 14 pages, USA.
International Searching Authority, International Search Report and Written Opinion from International Application No. PCT/US2011/021226, dated Aug. 22, 2011, 11 pages, European Patent Office, The Netherlands.
International Searching Authority, International Search Report and Written Opinion from International Application No. PCT/US2011/021234, dated Aug. 22, 2011, 12 pages, European Patent Office, The Netherlands.
United States Patent and Trademark Office, Office Action for U.S. Appl. No. 13/288,364, dated Nov. 7, 2012, 16 pages, USA.
United States Patent and Trademark Office, Office Action for U.S. Appl. No. 13/547,934, dated Nov. 13, 2012, 14 pages, USA.
United States Patent and Trademark Office, Office Action for U.S. Appl. No. 13/547,831, dated Nov. 28, 2012, 15 pages, USA.
United States Patent and Trademark Office, Office Action for U.S. Appl. No. 13/288,359, dated Dec. 6, 2012, 17 pages, USA.
United States Patent and Trademark Office, Office Action for U.S. Appl. No. 13/229,376, dated Jan. 16, 2013, 11 pages, USA.
United States Patent and Trademark Office, Office Action for U.S. Appl. No. 13/361,275, Sep. 20, 2013, 27 pages, USA.
United States Patent and Trademark Office, Office Action for U.S. Appl. No. 13/644,107, Sep. 26, 2013, 34 pages, USA.
United States Patent and Trademark Office, Office Action for U.S. Appl. No. 13/288,359, Nov. 18, 2013, 11 pages, USA.
United States Patent and Trademark Office, Office Action for U.S. Appl. No. 13/229,322, Jan. 28, 2014, 11 pages, USA.
United States Patent and Trademark Office, Office Action for U.S. Appl. No. 13/288,364, Mar. 13, 2014, 11 pages, USA.
United States Patent and Trademark Office, Office Action for U.S. Appl. No. 13/547,831, Mar. 20, 2014, 11 pages, USA.
United States Patent and Trademark Office, Office Action for U.S. Appl. No. 13/547,934, Apr. 1, 2014, 14 pages, USA.
United States Patent and Trademark Office, Office Action for U.S. Appl. No. 13/288,359, Apr. 11, 2014, 11 pages, USA.
United States Patent and Trademark Office, Notice of Allowance and Fees Due for U.S. Appl. No. 13/361,275, Aug. 4, 2014, 13 pages, USA.
United States Patent and Trademark Office, Office Action for U.S. Appl. No. 13/288,364, Aug. 26, 2014, 16 pages, USA.
United States Patent and Trademark Office, Office Action for U.S. Appl. No. 13/547,831, Aug. 26, 2014, 17 pages, USA.

(56) References Cited

OTHER PUBLICATIONS

United States Patent and Trademark Office, Office Action for U.S. Appl. No. 13/547,934, Aug. 26, 2014, 14 pages, USA.
United States Patent and Trademark Office, Notice of Allowance and Feed Due for U.S. Appl. No. 13/229,376, Aug. 7, 2014, 8 pages, USA.
United States Patent and Trademark Office, Office Action for U.S. Appl. No. 13/644,107, Apr. 30, 2014, 31 pages, USA.
United States Patent and Trademark Office, Office Action for U.S. Appl. No. 13/229,376, May 7, 2014, 12 pages, USA.
United States Patent and Trademark Office, Office Action for U.S. Appl. No. 13/229,322, Jul. 16, 2014, 13 pages, USA.

* cited by examiner

PROVIDING AND RECEIVING WIRELESS BROADCASTS

BACKGROUND

At present, there are over 700 major network television affiliates, 1,600 smaller network television affiliates, and 3,000 community broadcasters across the United States. Various entities need a solution that will allow them to deliver such broadcasts (and/or other content) via wireless networks while complying with applicable laws.

BRIEF SUMMARY

In general, embodiments of the present invention provide systems, methods, apparatus, and computer program products for wirelessly providing transcoded broadcasts to mobile devices and receiving content wirelessly via mobile devices.

In accordance with one aspect, a method wirelessly providing at least one transcoded broadcast to mobile devices is provided. In one embodiment, the method comprises (1) receiving an over-the-air broadcast from a broadcast system, wherein the over-the-air broadcast (a) is associated with a broadcast area and (b) is in an over-the-air broadcast format; (2) transcoding the over-the-air broadcast in the over-the-air broadcast format to a transcoded broadcast in a transcoded broadcast format; and (3) wirelessly broadcasting the transcoded broadcast.

In accordance with another aspect, an apparatus comprising at least one processor and at least one memory including computer program code is provided. In one embodiment, the at least one memory and the computer program code may be configured to, with the processor, cause the apparatus to at least (1) receive an over-the-air broadcast from a broadcast system, wherein the over-the-air broadcast (a) is associated with a broadcast area and (b) is in an over-the-air broadcast format; (2) transcode the over-the-air broadcast in the over-the-air broadcast format to a transcoded broadcast in a transcoded broadcast format; and (3) wirelessly broadcast the transcoded broadcast.

In accordance with yet another aspect, a computer program product wirelessly providing at least one transcoded broadcast to mobile devices is provided. The computer program product may comprise at least one computer-readable storage medium having computer-readable program code portions stored therein, the computer-readable program code portions comprising executable portions configured to (1) receive an over-the-air broadcast from a broadcast system, wherein the over-the-air broadcast (a) is associated with a broadcast area and (b) is in an over-the-air broadcast format; (2) transcode the over-the-air broadcast in the over-the-air broadcast format to a transcoded broadcast in a transcoded broadcast format; and (3) wirelessly broadcast the transcoded broadcast.

In accordance with one aspect, a method for wirelessly providing transcoded broadcasts to mobile devices s is provided. In one embodiment, the method comprises (1) receiving a plurality of over-the-air broadcasts from respective broadcast systems, wherein each of the plurality of over-the-air broadcasts (a) is associated with a broadcast area and (b) is in an over-the-air broadcast format; (2) transcoding each of the plurality of over-the-air broadcasts to a transcoded broadcast in a transcoded broadcast format; and (3) wirelessly broadcasting each of the plurality of transcoded broadcasts.

In accordance with another aspect, an apparatus comprising at least one processor and at least one memory including computer program code is provided. In one embodiment, the at least one memory and the computer program code may be configured to, with the processor, cause the apparatus to at least (1) receive a plurality of over-the-air broadcasts from respective broadcast systems, wherein each of the plurality of over-the-air broadcasts (a) is associated with a broadcast area and (b) is in an over-the-air broadcast format; (2) transcode each of the plurality of over-the-air broadcasts to a transcoded broadcast in a transcoded broadcast format; and (3) wirelessly broadcast each of the plurality of transcoded broadcasts.

In accordance with yet another aspect, a computer program product for wirelessly providing transcoded broadcasts to mobile devices is provided. The computer program product may comprise at least one computer-readable storage medium having computer-readable program code portions stored therein, the computer-readable program code portions comprising executable portions configured to (1) receive a plurality of over-the-air broadcasts from respective broadcast systems, wherein each of the plurality of over-the-air broadcasts (a) is associated with a broadcast area and (b) is in an over-the-air broadcast format; (2) transcode each of the plurality of over-the-air broadcasts to a transcoded broadcast in a transcoded broadcast format; and (3) wirelessly broadcast each of the plurality of transcoded broadcasts.

In accordance with one aspect, a method for wirelessly receiving at least one transcoded broadcast is provided. In one embodiment, the method comprises wirelessly receiving a transcoded broadcast that is wirelessly broadcast from a distribution device, wherein the distribution device: received the transcoded broadcast as an over-the-air broadcast from a broadcast system, wherein the over-the-air broadcast (a) is associated with a broadcast area and (b) is in an over-the-air broadcast format, transcoded the over-the-air broadcast in the over-the-air broadcast format to a transcoded broadcast in a transcoded broadcast format, and wirelessly broadcast the transcoded broadcast.

In accordance with another aspect, an apparatus comprising at least one processor and at least one memory including computer program code is provided. In one embodiment, the at least one memory and the computer program code may be configured to, with the processor, cause the apparatus to at least wirelessly receive a transcoded broadcast that is wirelessly broadcast from a distribution device, wherein the distribution device: received the transcoded broadcast as an over-the-air broadcast from a broadcast system, wherein the over-the-air broadcast (a) is associated with a broadcast area and (b) is in an over-the-air broadcast format, transcoded the over-the-air broadcast in the over-the-air broadcast format to a transcoded broadcast in a transcoded broadcast format, and wirelessly broadcast the transcoded broadcast.

In accordance with yet another aspect, a computer program product for wirelessly receiving at least one transcoded broadcast is provided. The computer program product may comprise at least one computer-readable storage medium having computer-readable program code portions stored therein, the computer-readable program code portions comprising executable portions configured to wirelessly receive a transcoded broadcast that is wirelessly broadcast from a distribution device, wherein the distribution device: received the transcoded broadcast as an over-the-air broadcast from a broadcast system, wherein the over-the-air broadcast (a) is associated with a broadcast area and (b) is in an over-the-air broadcast format, transcoded the over-the-air broadcast in the over-the-air broadcast format to a transcoded broadcast in a transcoded broadcast format, and wirelessly broadcast the transcoded broadcast.

In accordance with one aspect, a method for wirelessly receiving a plurality of transcoded broadcasts is provided. In one embodiment, the method comprises wirelessly receiving a plurality of transcoded broadcasts that are wirelessly broadcast from a distribution device, wherein the distribution device: received each of the plurality of the transcoded broadcasts as an over-the-air broadcast from respective broadcast systems, wherein each of the over-the-air broadcasts (a) is associated with a broadcast area and (b) is in an over-the-air broadcast format, transcoded each of the over-the-air broadcasts to a transcoded broadcast in a transcoded broadcast format, and wirelessly broadcast the transcoded broadcast.

In accordance with another aspect, an apparatus comprising at least one processor and at least one memory including computer program code is provided. In one embodiment, the at least one memory and the computer program code may be configured to, with the processor, cause the apparatus to at least wirelessly receive a plurality of transcoded broadcasts that are wirelessly broadcast from a distribution device, wherein the distribution device: received each of the plurality of the transcoded broadcasts as an over-the-air broadcast from respective broadcast systems, wherein each of the over-the-air broadcasts (a) is associated with a broadcast area and (b) is in an over-the-air broadcast format, transcoded each of the over-the-air broadcasts to a transcoded broadcast in a transcoded broadcast format, and wirelessly broadcast the transcoded broadcast.

In accordance with yet another aspect, a computer program product for wirelessly receiving a plurality of transcoded broadcasts is provided. The computer program product may comprise at least one computer-readable storage medium having computer-readable program code portions stored therein, the computer-readable program code portions comprising executable portions configured to wirelessly receive a plurality of transcoded broadcasts that are wirelessly broadcast from a distribution device, wherein the distribution device: received each of the plurality of the transcoded broadcasts as an over-the-air broadcast from respective broadcast systems, wherein each of the over-the-air broadcasts (a) is associated with a broadcast area and (b) is in an over-the-air broadcast format, transcoded each of the over-the-air broadcasts to a transcoded broadcast in a transcoded broadcast format, and wirelessly broadcast the transcoded broadcast.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 7:
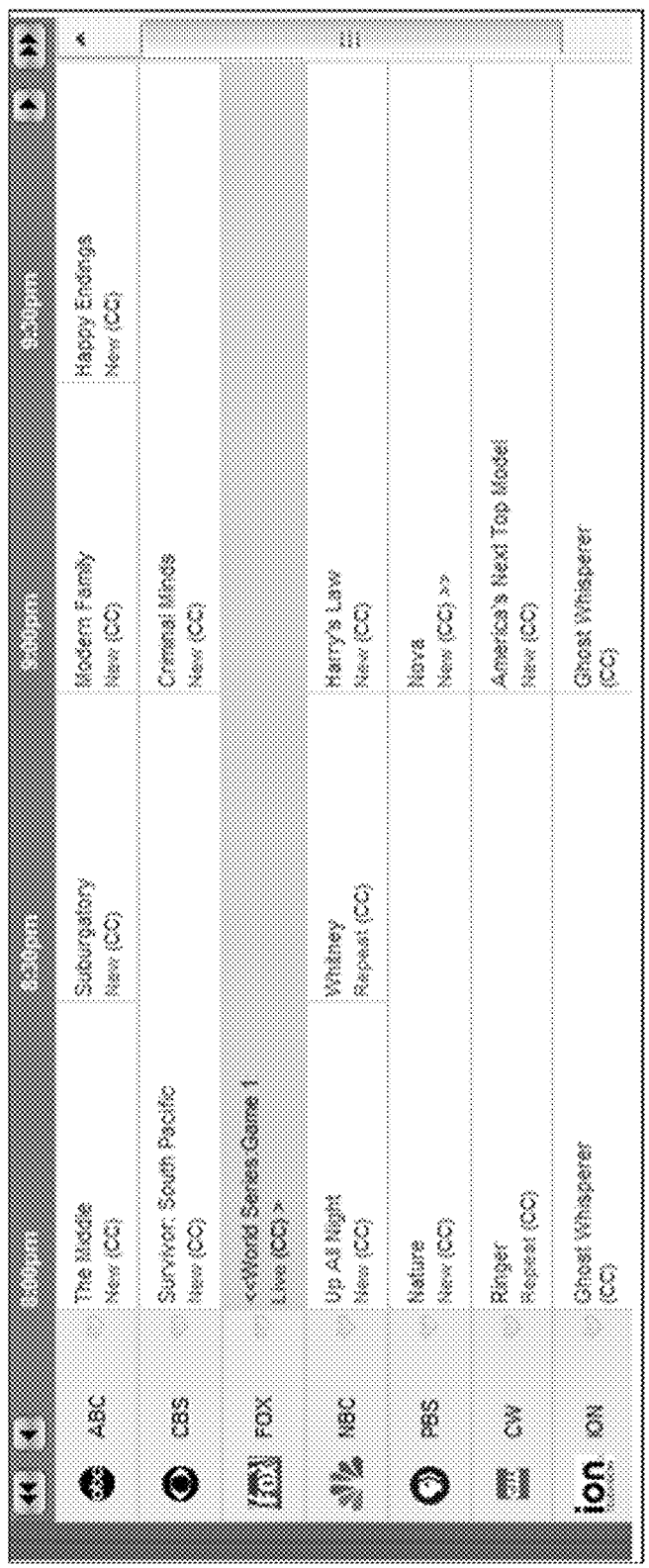
Figure 8:
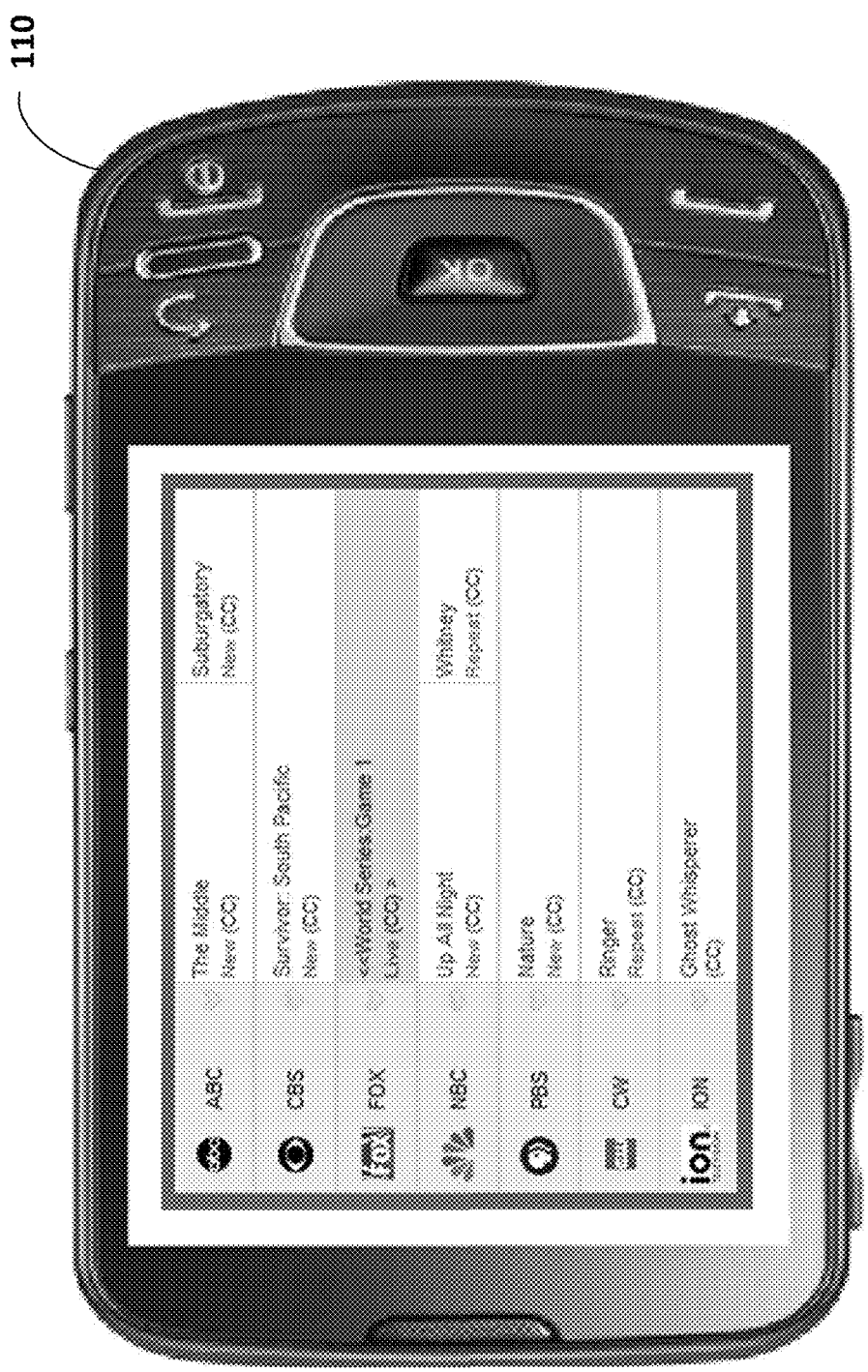
Figure 9:

FIGS. 7, 8, and 9 show exemplary input and output (including user interactions) that can be produced in accordance with various embodiments of the present invention.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. Like numbers refer to like elements throughout. The term "exemplary" is used to be an example with no indication of quality level.

I. Methods, Apparatus, Systems, and Computer Program Products

As should be appreciated, various embodiments may be implemented in various ways, including as methods, apparatus, systems, or computer program products. Accordingly, various embodiments may take the form of an entirely hardware embodiment or an embodiment in which a processor is programmed to perform certain steps. Furthermore, various implementations may take the form of a computer program product on a computer-readable storage medium having computer-readable program instructions embodied in the storage medium. Any suitable computer-readable storage medium may be utilized including hard disks, CD-ROMs, optical storage devices, or magnetic storage devices.

Various embodiments are described below with reference to block diagrams and flowchart illustrations of methods, apparatus, systems, and computer program products. It should be understood that each block of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

II. Exemplary System Architecture

Figure 1:
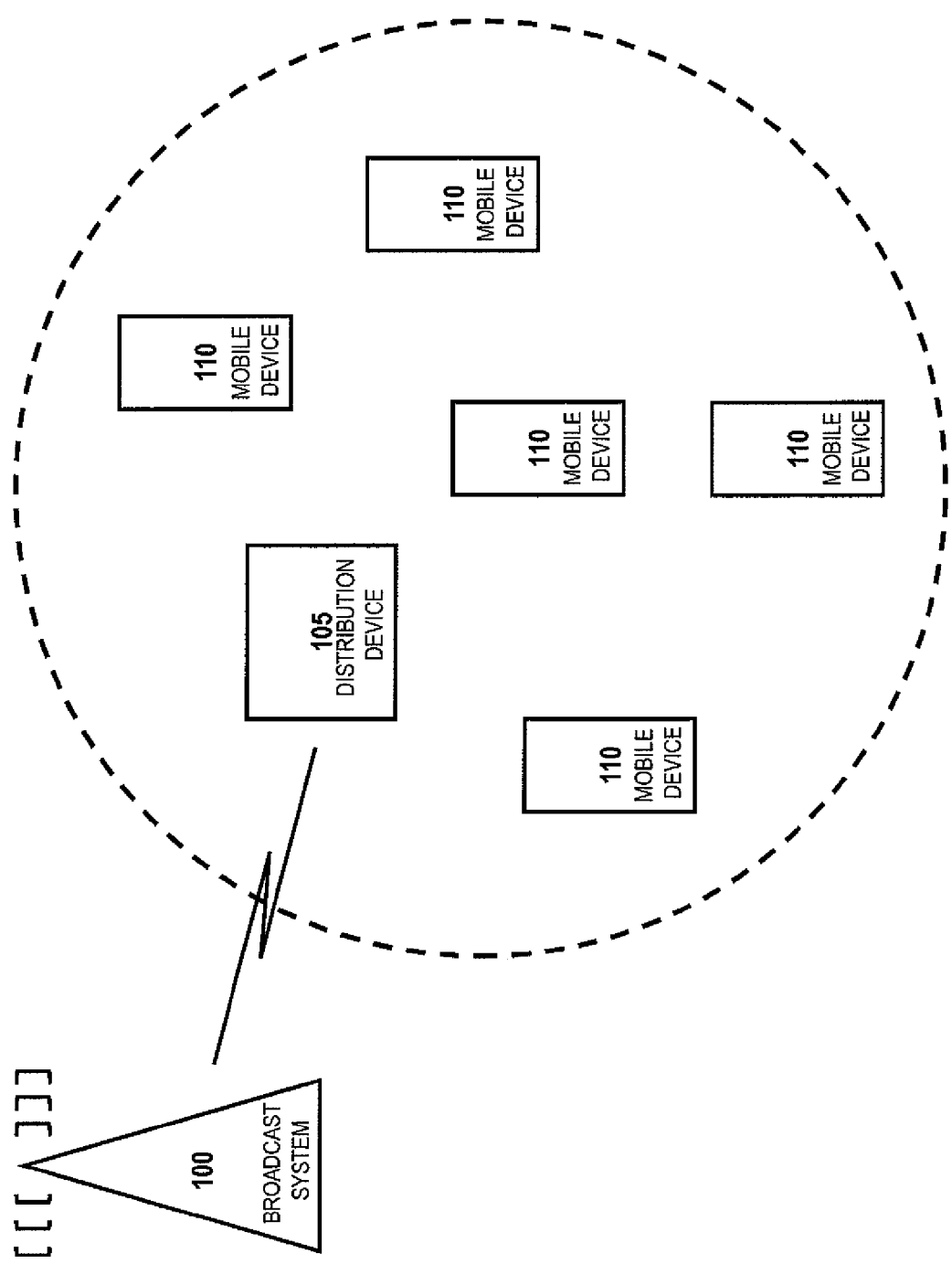
FIG. 1 is an overview of a system that can be used to practice various embodiments of the present invention.

FIG. 1 provides an illustration of a system that may be used in conjunction with various embodiments of the present invention. As shown in FIG. 1, the system may include one or more broadcast systems 100, one or more distribution devices 105, one or more networks, and one or more mobile devices 110. Each of the components of the system may be in electronic communication with, for example, one another over the same or different wireless or wired networks including, for example, a wired or wireless Personal Area Network (PAN), Local Area Network (LAN), Metropolitan Area Network (MAN), Wide Area Network (WAN), and/or the like. Additionally, while FIG. 1 illustrates certain system entities as separate, standalone entities, the various embodiments are not limited to this particular architecture.

1. Broadcast System

Embodiments of the present invention may be used in combination with a variety of broadcast systems 100 corresponding, for example, to different broadcasters. For instance, in the Cedar Rapids-Waterloo-Iowa City-Dubuque broadcast area, the broadcasters may be KCRG, KFXA, KFXB, KGAN, KIIN, KPXR, KRIN, KWKB, KWWF, and/or KWWL. Further, a broadcast system 100 may be an over-the-air (OTA) broadcast system, a cable broadcast system, a satellite broadcast system, and/or a variety of other systems for transmitting/broadcasting broadcasts.

a. Over-the-Air Broadcast System

Figure 2:
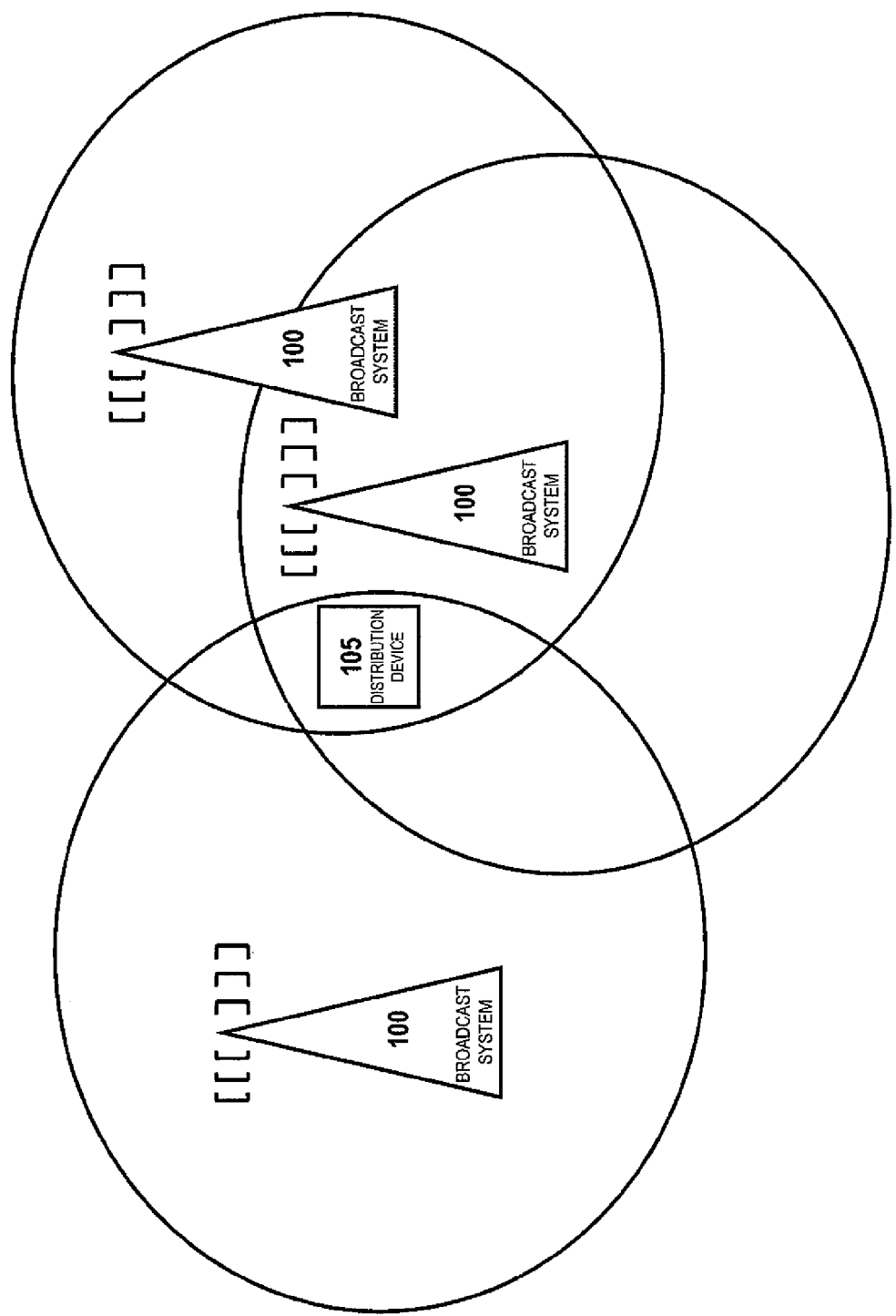
FIG. 2 shows broadcast areas served by broadcast systems according to one embodiment of the present invention.
Figure 3:
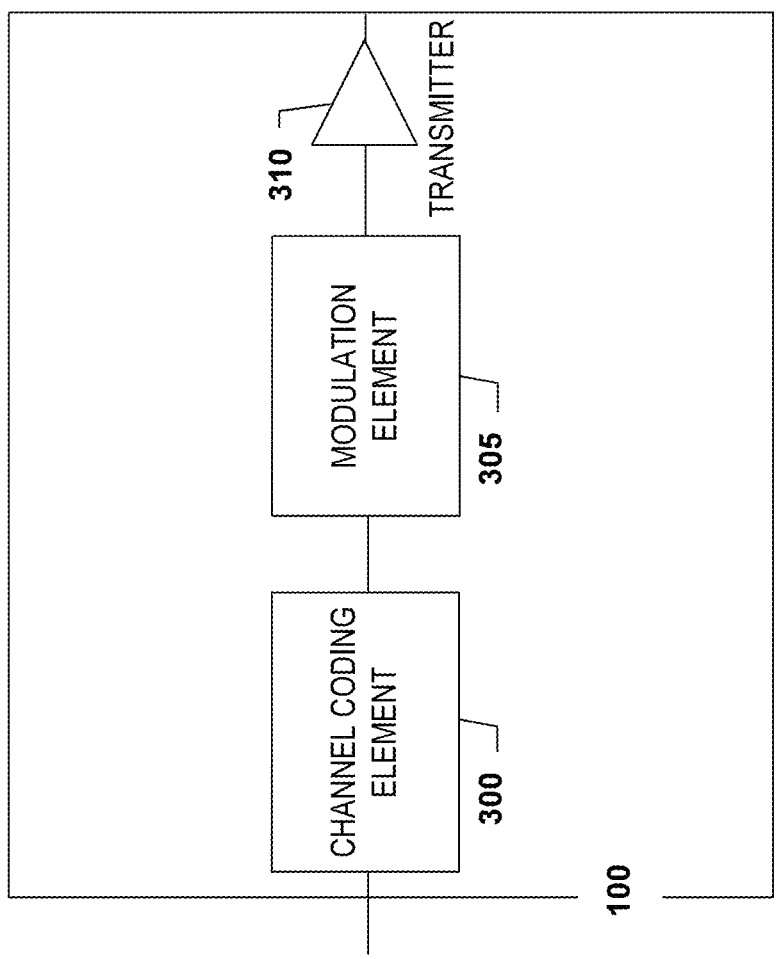
FIG. 3 is an exemplary schematic of a broadcast system according to one embodiment of the present invention.

FIG. 2 provides an exemplary schematic representative of an OTA broadcast system 100 that can be used in conjunction with embodiments of the present invention. The OTA broadcast system 100 may be owned and/or operated by a broadcaster (e.g., KCRG, KFXA, KFXB, KGAN, KIIN, KPXR, KRIN, KWKB, KWWF, and/or KWWL) and associated with a broadcast area (e.g., Cedar Rapids-Waterloo-Iowa City-Dubuque broadcast area). Broadcast areas may be designated market areas (DMAs), zip codes, block groups, census tracts, cartographic levels, government-established areas/zones, geographic areas, and/or the like. As will be recognized, a broadcaster may have one or more OTA broadcast systems 100 depending on the geographic area (e.g., DMA, zip code, block group, census tract, cartographic level, government-established area/zone, geographic area, and/or the like) the broadcast area includes.

An OTA broadcast system 100 may include various components to transmit/broadcast content and/or data via an OTA broadcast (e.g., an OTA broadcast signal) to be received by one or more distribution devices 105. As shown in FIG. 2, in one embodiment, the OTA broadcast system 100 may include one or more channel coding elements 200, one or more modulation elements 205, and one or more transmitters 210. Although not shown, the OTA broadcast system 100 may also include various other components, such as audio subsystems, video subsystems, multiplexers, exciters, drivers, amplifiers, network interfaces, processing elements, and/or the like. Via these elements, for instance, the OTA broadcast system 100 can transmit/broadcast OTA broadcasts (comprising content and/or data) within a broadcast area. The OTA broadcast system 100 may transmit/broadcast the broadcast (e.g., OTA broadcast) in a first broadcast format using a variety of standards and protocols, such as Advanced Television Systems Committee (ATSC), Terrestrial Integrated Services Digital Broadcasting (ISDB-T), Terrestrial Digital Multimedia Broadcasting (T-DMB), Digital Video Broadcasting-Terrestrial (DVB-T), Digital Video Broadcasting-Handheld (DVB-H), Digital Terrestrial Multimedia Broadcast (DTMB), Satellite Terrestrial Interactive Multi-service Infrastructure (STiMi), National Television System Committee (NTSC) standards and protocols, and/or the like.

As indicated, the broadcast (e.g., OTA broadcast) may include both content and/or data. Generally, the term "content" may refer to any type of media, whether audio, video, text, and/or the like. For example, content may include television broadcasts (e.g., live local newscasts), television programs (e.g., The Office), sporting events, movies (e.g., video-on-demand (VOD)), datacasts, music, images, videos, text, webpages, and/or the like. The term "data" may refer to any type of data, including ancillary data, control data, conditional access control data, data associated with program audio and/or video services (e.g., closed captioning), and/or the like.

It will be appreciated that one or more of a broadcast system's 100 components and other broadcaster components may be located remotely from one another. Furthermore, one or more of the components may be combined and additional components performing functions described herein may be included.

b. Cable Broadcast System

Although not shown, a cable broadcast system (also referred to as a broadcast system 100) may be used with embodiments of the present invention. A cable broadcast system may include various components to transmit/broadcast content and/or data via the cable provider's broadcast system to the cable provider's subscribers. For example, in various embodiments, the cable broadcast system may include a network operations center, a cable modem termination system, and a headend to transmit cable broadcasts (e.g., digital cable signals) through the cable provider's distribution network to distribution devices 105. Thus, distribution devices 105 may communicate with a headend over a distribution network. The distribution devices 105 may the broadcast content and/or data from the cable broadcast system wirelessly for reception by mobile devices 110 within range.

To perform such functions, the cable broadcast system may include various components, such as audio subsystems, video subsystems, multiplexers, switches, encoders satellite receivers and antennae, network interfaces, decoding elements, encoding elements, processing elements, transmitting elements, modulation elements, and/or the like. The cable broadcast system may be capable of receiving content and/or data and/or transmitting content and/or data (e.g., transmit broadcast signals in a one-to-many or broadcast configuration) in a first broadcast format using a variety of standards and protocols to distribution devices 105, including those described with regard to the OTA broadcast system 100 and/or further including various versions of data over cable service interface specification (DOCSIS).

c. Satellite Broadcast System

Although not shown, a satellite broadcast system (also referred to as a broadcast system 100) may be used with embodiments of the present invention. A satellite broadcast system may include various components to transmit/broadcast content and/or data (e.g., transmit broadcast signals in a one-to-many or broadcast configuration) via the satellite provider's broadcast system to distribution devices 105 (e.g., subscribers). For example, in various embodiments, the satellite broadcast system may include uplink facilities (with transmitting antennae), satellites (with transponders), receiving satellite dishes, and/or distribution devices 105. Thus, the satellite broadcast system can transmit/broadcast satellite broadcasts (comprising content and/or data) to distribution devices 105 in a first broadcast format using a variety of standards and protocols, such as those described with regard to the OTA broadcast system 100 and/or further including direct broadcast satellite (DBS), television receive only (TVRO), and/or the like.

2. Distribution Device

Figure 4:
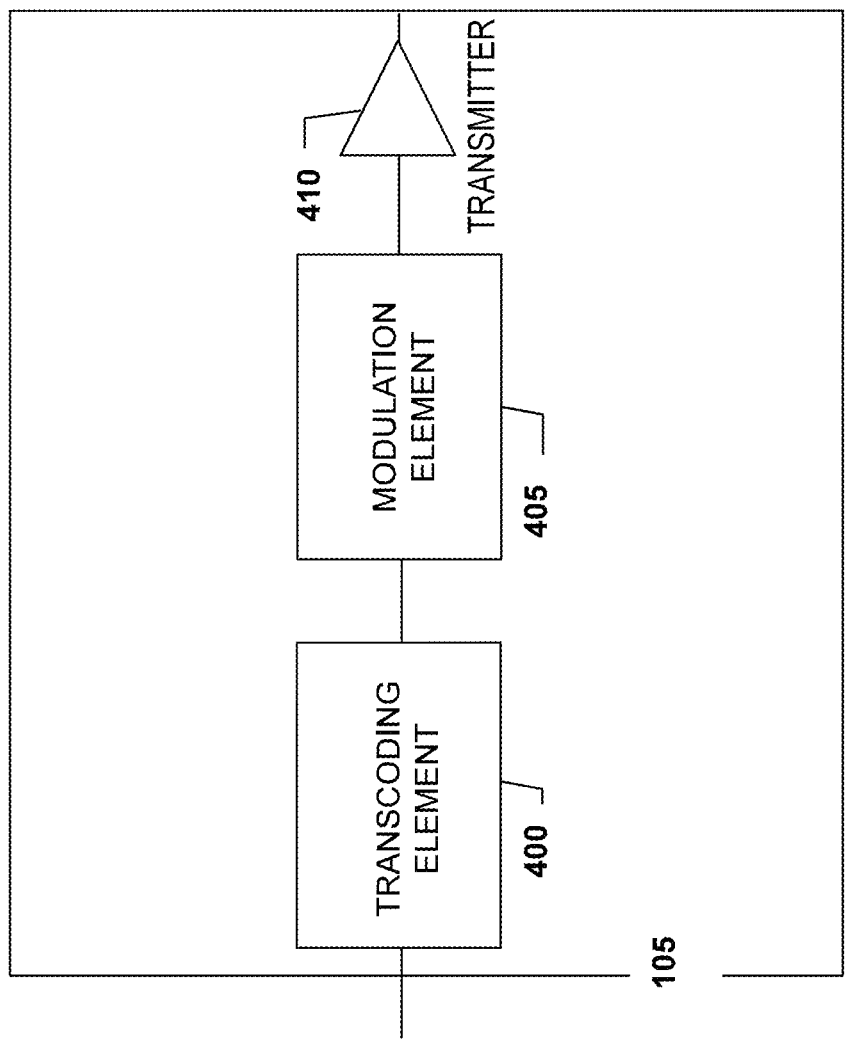
FIG. 4 is an exemplary schematic of a distribution device according to one embodiment of the present invention.

FIG. 4 provides an exemplary schematic representative of a distribution device 105 that can be used in conjunction with embodiments of the present invention. In general, the term "distribution device" may refer to, for example, a device located within a specific broadcast area (e.g., DMA, zip code, block group, census tract, cartographic level, government-established area/zone, geographic area, and/or the like). Further, the term "device" used herein may refer to, for example, one or more computers, computing devices, computing entities, mobile phones, desktops, tablets, notebooks, laptops, distributed systems, servers, blades, gateways, switches, processing devices, processing entities, relays, routers, network access points, base stations, the like, and/or any combination of devices or entities adapted to perform the functions, operations, and/or processes described herein.

The distribution device 105 may include one or more antennae (not shown), one or more receivers (not shown), one or more tuners or tuner cards (not shown), a transcoding element 400, one or more modulation elements 405, one or more transmitters 410, one or more receivers (not shown), one or more network interfaces (not shown), one or more processing elements, and/or the like. In one embodiment, via the one or more antennae, receivers, and/or tuners or tuner cards, the distribution device 105 can receive broadcasts from various broadcast systems 100 corresponding to respective broadcasters (see FIG. 2). For example, a distribution device 105 positioned at an airport (e.g., Eastern Iowa Airport, Waterloo Regional Airport, Dubuque Regional Airport) in the Cedar Rapids-Waterloo-Iowa City-Dubuque broadcast area may simultaneously or substantially simultaneously receive OTA broadcasts from KCRG, KFXA, KFXB, KGAN, KIIN, KPXR, KRIN, KWKB, KWWF, and/or KWWL. In embodiment, the distribution device 105 may receive broadcasts of content and/or data from one or more broadcast systems 100 in a variety of formats, including ATSC, ISDB-T, T-DMB, DVB-T, DVB-H, STiMi, NTSC, DBS, TVRO, DOCSIS, and/or the like. In one embodiment, the format the data and/or content are received by the distribution device 105 from the broadcast system 100 may be referred to as the first broadcast format, first format, satellite format, cable format, OTA format, and/or the like. The format may define the standards, protocols, display resolutions (vertical and horizontal), aspect ratios, pixel aspect ratios (e.g., square, non-square), scanning (e.g., progressive, interlaced, etc.), frame/field rates, containers, codecs, and/or the like for the corresponding content and/or data (e.g., received broadcast).

After receiving such broadcasts, one or more transcoding elements 400 may provide for direct digital-to-digital conversion of content and/or data (e.g., a broadcast) in the various broadcasts from one encoding to another referred to herein as a transcoded format, a second format, and/or the like. In one embodiment, transcoding may convert a broadcast (e.g., an OTA broadcast comprising content and/or data) to a lower bit rate, for example, or from an incompatible or obsolete format to a better-supported or modern format. For instance, the transcoding element 400 may transcode/convert the broadcast received in the OTA broadcast format to a transcoded broadcast format, such as H.264, H.263, Flash Video (FLV), Hypertext Markup Language 5 (HTML5), VP6, VP8, various Moving Picture Experts Group (MPEG) formats, and/or the like. Thus, the transcoded format may also define the standards, protocols, display resolutions (vertical and horizontal), aspect ratios, pixel aspect ratios (e.g., square, non-square), scanning (e.g., progressive, interlaced, etc.), frame/field rates, containers, codecs, and/or the like for the corresponding content and/or data (e.g., transcoded broadcast).

The distribution device 105 may also be capable of operating with one or more air interface standards, communication protocols, modulation types, and access types. More particularly, the distribution device 105 may operate in accordance with any of wireless standards and protocols, and/or the like. For example, the distribution device 105 may operate in accordance with any of a number of different wireless networking techniques, such as general packet radio service (GPRS), Universal Mobile Telecommunications System (UMTS), Code Division Multiple Access 2000 (CDMA2000), CDMA2000 1X (1xRTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra wideband (UWB), infrared (IR) protocols, Bluetooth protocols, wireless universal serial bus (USB) protocols, a number of second-generation (2G) protocols, third-generation (3G) protocols, fourth-generation (4G) protocols, and/or any other wireless protocol. Using such wireless standards and protocols, the distribution device 105 can unicast, multicast, and/or broadcast (e.g., using WiFi) the transcoded content and/or data to mobile devices 110 within the distribution device's 105 range. For example, the distribution device 105 can unicast, multicast, and/or broadcast (e.g., using WiFi) the broadcasts it received and transcoded from KCRG, KFXA, KFXB, KGAN, KIIN, KPXR, KRIN, KWKB, KWWF, and/or KWWL. In a particular embodiment, the distribution device 105 can broadcast the broadcasts it received and transcoded using WiFi. In one embodiment, Wi-Fi may have a broadcast range of up to 110 feet indoors and 300 feet outdoors, which can be extended by using multiple distribution devices 105 or repeaters placed in different locations and/or using other techniques and approaches. Range limitations may limit access to transcoded broadcasts due to the limited range of the transmission/broadcast.

In one embodiment, the distribution device 105 can also perform and support various encryption and decryption methods and techniques. Such encryption and decryption methods and techniques can be performed at various levels. For example, in one embodiment, for at least some instances, the distribution device 105 can encrypt the broadcasts of content and/or data such that the content and/or data can only be decrypted by mobile devices 110 with the appropriate decryption ability. As will be recognized, a variety of approaches and techniques can be used to adapt to various needs and circumstances.

It will be appreciated that one or more of a distribution device's 105 components and other broadcaster components may be located remotely from one another. Furthermore, one or more of the components may be combined and additional components performing functions described herein may be included.

3. Mobile Device

Figure 5:
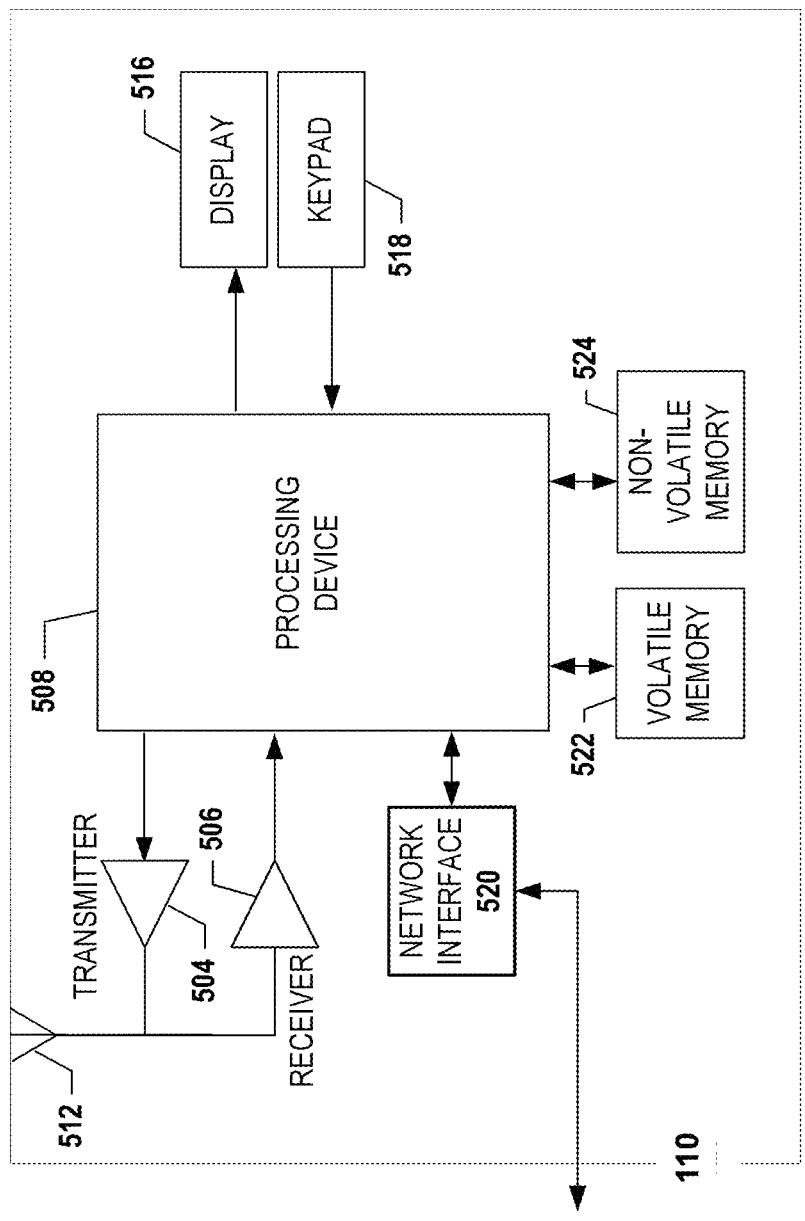
FIG. 5 is an exemplary schematic of a mobile device according to one embodiment of the present invention.

FIG. 5 provides an exemplary schematic representative of a mobile device 110 (e.g., an electronic device) that can be used in conjunction with embodiments of the present invention. As previously described, the term "device" used herein may refer to, for example, one or more computers, computing devices, computing entities, mobile phones, desktops, tablets, notebooks, laptops, distributed systems, servers, blades, gateways, switches, processing devices, processing entities, relays, routers, network access points, base stations, the like, and/or any combination of devices or entities adapted to perform the functions, operations, and/or processes described herein. As shown in FIG. 5, the mobile device 110 may include an antenna 512, a transmitter 504, a receiver 506, a network interface 520, tuner or tuner card (not shown), and a processing device 508 (e.g., a processor, controller, and/or the like) that provides signals to and receives signals from the transmitter 504 (and/or network interface 520) and receiver 506 (and/or network interface 520).

The signals provided to the transmitter 504 (and/or network interface 520) and received from the receiver 506 (and/or network interface 520) may include signaling information in accordance with an air interface standard of applicable wireless systems (or wired systems). For example, the mobile device 110 may be capable of operating with one or more standards, communication protocols, modulation types, and access types as described above with respect to the distribution device 105. In one embodiment, the mobile device 110 can receive one or more transcoded broadcasts from the distribution device 105 and cause display of the same (see FIG. 9).

The mobile device 110 may also comprise a user interface (that can include a display 516 coupled to a processing device 508) and/or a user input interface (coupled to the processing device 508). The user input interface can comprise any of a number of devices allowing the mobile device 110 to receive input and/or data, such as a keypad 518, a touch display, voice or motion interfaces, or other input device. In one embodiment, the mobile device 110 use an interactive guide, for example, to allow the user to access transcoded content (see FIGS. 7, 8, and 9). The mobile device 110 can also include volatile memory 522 and/or non-volatile memory 524, which can be embedded and/or may be removable as described above with respect to the distribution device 105. The memory can store any of a number of pieces or amount of information/data used by the mobile device 110, such as a module, program, application, and/or the like.

III. Exemplary System Operation

Figure 6:
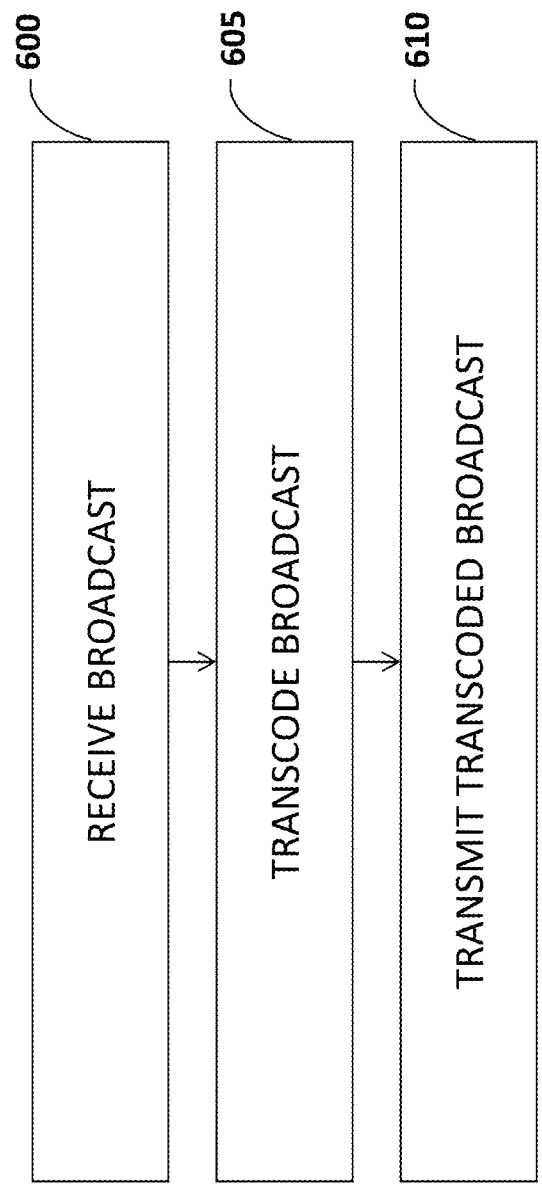
FIG. 6 is a flowchart illustrating operations and processes that can be used in accordance with various embodiments of the present invention.

Reference will now be made to FIGS. 6-9. FIG. 6 is a flowchart illustrating operations and processes that may be performed for providing content wirelessly to mobile devices 110. FIGS. 7, 8, and 9 show exemplary input and output (including user interactions) that can be produced in accordance with various embodiments of the present invention. The described examples are provided for illustrative purposes only and should not be taken in any way as limiting embodiments of the present invention to the examples provided.

1. Authenticating Distribution Devices

In one embodiment, a distribution device 105 can be authenticated as being within, proximate, or associated with a broadcast area. Systems, methods, apparatus, computer program products, techniques, and concepts for authenticating distribution devices 105 are described in U.S. Pat. No. 8,255,944; U.S. Pat. No. 8,255,945; U.S. Pat. No. 8,255,946; U.S. Pat. No. 8,255,947; U.S. Pat. No. 8,255,940; U.S. Pat. No. 8,255,941; U.S. Pat. No. 8,255,942; U.S. Pat. No. 8,255,943; U.S. Publ. Appl. No. 2012-0196596; U.S. Publ. Appl. No. 2012-0196595; U.S. application Ser. No. 13/547,831; and U.S. application Ser. No. 13/547,934. These Patents, published applications, and applications are hereby incorporated herein in their entireties by reference.

In the patents, published applications, and applications incorporated herein by reference, authentication of distribution devices 105 can be carried out in similar manners to those described therein with regard to the local device. However, as will be recognized, a variety of other approaches and techniques can be used to adapt to various needs and circumstances.

2. Receiving Broadcasts

In one embodiment, one or more distribution devices 105 can receive broadcasts comprising content and/or data (Block 600 of FIG. 6). The broadcasts can be received from various broadcast systems 100 corresponding to respective broadcasters. The broadcast systems 100 may be OTA broadcast systems, satellite broadcast systems, cable broadcast systems, and/or the like. The following descriptions are provided in the context of an OTA broadcast system and OTA broadcasts; however, embodiments of the present invention are not limited to this particular architecture.

As will be recognized, embodiments of the present invention can be used in a variety of settings, such as homes, offices, ballparks, conference centers, hotels, theme parks, golf courses, beaches, stadiums, arenas, parks, apartment complexes, industrial complexes, airports, train stations, airplanes, buses, subways, and/or the like. The following embodiment is described in the context of an airport (e.g., Eastern Iowa Airport, Waterloo Regional Airport, or Dubuque Regional Airport) providing broadcasts to parties at the airport as a free service, pay-per-use service, and/or the like. Although the following embodiments describe an implementation at an airport, such embodiments are provided for illustrative purposes only and are not limiting to embodiments of the present invention. Further, although much of the following description makes references to a single distribution device 105, multiple distribution devices and/or related entities that are adapted to perform the functions, operations, and/or processes described herein may also be used.

In one embodiment, a distribution device 105 can receive all OTA the broadcasts for its associated broadcast area (e.g., DMA, zip code, block group, census tract, cartographic level, government-established area/zone, geographic area, and/or the like)—provided it is within the appropriate range. For instance, a distribution device 105 positioned within or proximate the Eastern Iowa Airport, Waterloo Regional Airport, or Dubuque Regional Airport can simultaneously or substantially simultaneously receive OTA broadcasts for broadcast area 637 (Cedar Rapids-Waterloo-Iowa City-Dubuque broadcast area). The OTA broadcasters for broadcast area 637 (Cedar Rapids-Waterloo-Iowa City-Dubuque broadcast area) are provided below in Table 1.

TABLE 1

| BROADCASTER | AFFILIATION |
|---|---|
| KCRG | ABC |
| KFXA | FOX |
| KFXB | FOX |
| KGAN | CBS |
| KIIN | PBS |
| KPXR | ION |
| KRIN | PBS |
| KWKB | The CW |
| KWWF | AMG TV |
| KWWL | NBC |

Thus, a distribution device 105 positioned within the Eastern Iowa Airport, Waterloo Regional Airport, or Dubuque Regional Airport can simultaneously or substantially simultaneously receive OTA broadcasts from KCRG, KFXA, KFXB, KGAN, KIIN, KPXR, KRIN, KWKB, KWWF, and/or KWWL. In one embodiment, this may be possible by the distribution device 105 having multiple tuners, tuner cards, and/or receivers that simultaneously or substantially simultaneously receive these OTA broadcasts. For example, each tuner or tuner card in the distribution device 105 may be configured to receive a single OTA broadcast. That is, there may be a designated tuner or tuner card in the distribution device 105 for each respective broadcast from KCRG, KFXA, KFXB, KGAN, KIIN, KPXR, KRIN, KWKB, KWWF, and/or KWWL.

In one embodiment, such OTA broadcasts can be received in a variety of broadcast formats—e.g., standards, protocols, display resolutions (vertical and horizontal), aspect ratios, pixel aspect ratios (e.g., square, non-square), scanning (e.g., progressive, interlaced, etc.), frame/field rates, containers, codecs, and/or the like. For example, ATSC, ISDB-T, T-DMB, DVB-T, DVB-H, DTMB, STiMi, NTSC, DBS, TVRO, DOCSIS, and/or the like may define the standards, protocols, display resolutions, aspect ratios, pixel aspect ratios, scanning, frame/field rates, containers, and/or codecs that can be used with each format. Typically, these formats require substantial bandwidth for the transmission of their broadcasts (e.g., comprising data and/or content). The bandwidth may range, for example, from 19 megabits per second (Mbps) to 39 Mbps depending on the type of broadcast and the content and/or data being carried. Because of the bandwidth required, such formats are not necessarily optimized for viewing on mobile devices 110 that may be subject bandwidth constraints or usage charges.

3. Transcoding Broadcasts, Encrypting Broadcasts, and Broadcasting Transcoded Broadcasts After receiving such OTA broadcasts (Block 605 of FIG. 6), the distribution device 105 (via one or more transcoding elements 400) may provide for conversion of the broadcasts (comprising content and/or data). In one embodiment, the distribution device 105 may transcode each broadcast it receives. Continuing with the above example, the distribution device 105 may individually transcode each respective OTA broadcast receives from KCRG, KFXA, KFXB, KGAN, KIIN, KPXR, KRIN, KWKB, KWWF, and KWWL.

In one embodiment, transcoding may be performed by the distribution device 105 to optimize the broadcasts (comprising content and/or data) for viewing on mobile devices 110. For example, transcoding a broadcast may convert the OTA broadcast to a lower bit rate, for example, or from an incompatible or obsolete format to a better-supported or modern format. For instance, the distribution device 105 can receive the first OTA broadcast in an OTA broadcast format (e.g., first format) and transcode the OTA broadcast to a transcoded broadcast format (e.g., second format), such as H.264, H.263, FLV, HTML5, VP6, VP8, various MPEG formats, and/or the like. Certain of these formats may allow each transcoded broadcast to be broadcast using 1 Mbps to 1.5 Mbps (including redundancy) of bandwidth, instead of 19 Mbps to 39 Mbps of bandwidth.

In one embodiment, after transcoding the OTA broadcasts, the distribution device 105 may further prepare the transcoded broadcasts to be broadcast. In one embodiment, this may require encrypting (individually or collectively) the transcoded broadcasts using a one or more encryption schemes or techniques. For example, in one embodiment, the transcoded broadcasts may be encrypted using encryption approaches, such as Wired Equivalent Privacy (WEP), Wi-Fi Protected Setup (WPS), Wi-Fi Protected Access (WPA), Wi-Fi Protected Access II (WPA2), Wi-Fi Protected Access Pre-Shared Key (WPA-PSK). As will be recognized, embodiments of the present invention are not limited to the above-described approaches. Thus, a variety of symmetric and/or asymmetric encryption techniques can be used to adapt to various needs and circumstances, including Blowfish, Advanced Encryption Standard (AES), Data Encryption Standard (DES), Rivest-Shamir-Adleman (RSA), Diffie-Hellman encryption, and/or the like.

In one embodiment, such encryption keys can be managed by a secure key exchange entity (e.g., operating one or more secure key exchange computing devices), for example. This may allow the encryption keys to be distributed to the appropriate parties (e.g., distribution devices 105 and/or modules, programs, and/or applications executing on registered mobile devices 110) periodically, regularly, continuously, and/or in response to certain triggers via the secure key exchange entity (e.g., operating one or more secure key exchange computing devices). This may also allow the keys to be rolled or changed periodically, regularly, continuously, and/or in response to certain triggers for security reasons.

In one embodiment, by encrypting the transcoded broadcasts using the appropriate encryption key(s) provided via the secure key exchange (e.g., one or more secure key exchange computing devices), the transcoded broadcasts that are transmitted/broadcast by the distribution device 105 are not necessarily distributed using a normal streaming protocol. Rather, in this embodiment, only modules, programs, and/or applications executing on registered mobile devices 110 can catch, tune in, understand, and/or similar words used herein interchangeably the encrypted, transcoded broadcasts that are transmitted/broadcast by the distribution device 105. In addition to controlling access, this approach can be used to monitor usage, provide supplemental advertising opportunities, and/or a variety of other features.

In a particular embodiment, the distribution device 105 can then transmit/broadcast the transcoded broadcasts (Block 610 of FIG. 6). In a particular embodiment, the distribution device 105 can transmit/broadcast the transcoded broadcasts (and in certain cases encrypted) by broadcasting User Datagram Protocol (UDP) packets to a broadcast address via WiFi. For instance, one or more distribution devices 105 positioned within the Eastern Iowa Airport, Waterloo Regional Airport, or Dubuque Regional Airport can transmit/broadcast the transcoded broadcasts initially received as OTA broadcasts from KCRG, KFXA, KFXB, KGAN, KIIN, KPXR, KRIN, KWKB, KWWF, and/or KWWL using WiFi, for example. Further, as previously described, Wi-Fi may have a broadcast range of up to 110 feet indoors and 300 feet outdoors, which can be extended by using multiple distribution devices 105, repeaters, or similar computing devices placed in different locations and/or using other techniques and approaches. Thus, the mobile devices 110 within the range of the distribution device 105 may vary based on the corresponding network configuration and/or the transmission environment.

In one embodiment, because the transcoded broadcast is in a lower bit rate (e.g., using 1 Mbps to 1.5 Mbps instead of 19 Mbps to 39 Mbps), multiple transcoded broadcasts may be transmitted/broadcast via a single WiFi channel. For instance, assuming a typical WiFi channel has approximately 15 Mbps of bandwidth available for transmission/broadcast, the distribution device 105 can transmit/broadcast multiple transcoded broadcasts (and in certain cases encrypted) on a single channel. For instance, one or more distribution devices 105 positioned within the Eastern Iowa Airport, Waterloo Regional Airport, or Dubuque Regional Airport can simultaneously or substantially simultaneously transmit/broadcast the transcoded broadcasts initially received as OTA broadcasts from KCRG, KFXA, KFXB, KGAN, and KIIN on a first WiFi channel. And the one or more distribution devices 105 positioned within the Eastern Iowa Airport, Waterloo Regional Airport, or Dubuque Regional Airport can simultaneously or substantially simultaneously transmit/broadcast the transcoded broadcasts initially received as OTA broadcasts from KCRG, KFXA, KFXB, KGAN, and KIIN on a second WiFi channel. Thus, the embodiments described herein are scalable and can be used to adapt to various needs and circumstances.

4. Receiving Transcoded Broadcasts

In one embodiment, for a mobile device 110 to receive transcoded broadcasts (and in certain cases encrypted) that are transmitted/broadcast from a distribution device 105, the mobile device 110 may need the ability to catch, tune in, and/or understand (e.g., receive and decrypt) the transcoded broadcast as previously noted. In one embodiment, this ability may be provided by the use of a module, program, or application that has been downloaded or preinstalled (e.g., is resident) on the mobile device 110. A third-party company (such as Syncbak) may provide such modules, programs, and/or applications. For example, Syncbak may provide modules, programs, and/or applications for the Eastern Iowa Airport, Waterloo Regional Airport, and/or Dubuque Regional Airport for patrons to use when at the airports. And in turn, the respective airports may use the modules, programs, and/or applications to provide the broadcasts to their customers as a free service, pay-per-use service, and/or the like. With the third-party modules, programs, and/or applications executing on mobile devices 110, the mobile devices 110 to catch, tune in, and/or understand (e.g., receive and decrypt) the encrypted, transcoded broadcasts that are transmitted/broadcast by the distribution device 105.

In one embodiment, to catch, tune in, and/or understand (e.g., receive and decrypt) the encrypted, transcoded broadcasts, the module, program, or application executing on the mobile device 110 may require that the mobile device 110 be registered. Registration may require providing user information via the application executing on the mobile device 110 to an appropriate computing device. The user information may include a variety of information associated with the user and/or the mobile device 110. For example, the user information may include (a) the user's first and last name, (b) the user's address, (c) the user's zip code, (d) the user's telephone number, (e) a username, (f) a charge card number, (g) a distribution device identifier (e.g., Subscriber Identity Module (SIM) number, Media Access Control (MAC) address, International Mobile Subscriber Identity (IMSI) number, an Internet Protocol (IP) address, mobile equipment identifier (MEID)), and/or (h) the like. The user information may be used to uniquely identify the user and/or the mobile device 110. Further, the user information can be used to create a user account with the user information and electronically store at least a portion of the user information in association with the user account. The user account and/or user information may be used to receive broadcasts from the distribution device 105.

In one embodiment, once properly registered, the modules, programs, and/or applications executing on mobile devices 110 may operate in compliance with one or more encryption schemes or techniques, such as WEP, WPS, WPA, WPA2, WPA-PSK, and/or the like as described above with reference to the distribution device 105. For instance, the modules, programs, and/or applications executing on registered mobile devices 110 can receive the appropriate encryption keys to decrypt the encrypted, transcoded broadcasts via a secure key exchange entity (e.g., operating one or more secure key exchange computing devices). This may allow the encryption keys to be distributed to the appropriate parties (e.g., modules, programs, and/or applications executing on registered mobile devices 110) periodically, regularly, continuously, and/or in response to certain triggers via the secure key exchange entity (e.g., operating one or more secure key exchange computing devices). This may also allow the keys to be rolled or changed periodically, regularly, continuously, and/or in response to certain triggers.

In one embodiment, the encrypted, transcoded broadcasts can be decrypted using the appropriate encryption key(s) via the modules, programs, and/or applications executing on registered mobile devices 110. This approach can be used to limit what mobile devices 110 can catch, tune in, and/or understand (e.g., receive and decrypt) the encrypted, transcoded broadcasts. Further, this approach does not require bandwidth to be not allocated on a per-user basis. Moreover, in a WiFi environment, a user's data plan is note required; rather, any device within range of the distribution device 105 and with ability to catch, tune in, and/or understand (e.g., receive and decrypt) the encrypted, transcoded broadcasts can do so and cause display of the same. Thus, any mobile device 110 within range, for example, and with the appropriate ability to properly receive and decrypt the transcoded broadcasts (e.g., catch, tune in, and/or understand) can cause display of the same via the mobile device 110 (see FIG. 9).

In one embodiment, a guide can be transmitted/broadcast as a default channel that will be displayed by the mobile device 110 when initiating the module, program, and/or application executing on a registered mobile device 110. For instance, an exemplary guide is shown in FIG. 8. Via such an interactive guide, a user (e.g., operating a mobile device 110) can select the channel he or she wishes to access via the module, program, and/or application executing on a registered mobile device 110. For instance, the user may select to access the World Series broadcast being transmitted/broadcast by the distribution device 105 as an encrypted, transcoded broadcast via WiFi. After receiving the encrypted, transcoded broadcast, the mobile device 110 can decrypt and cause display of the same. Continuing with the above example, a user waiting at a gate for his or her airplane in the Eastern Iowa Airport, Waterloo Regional Airport, or Dubuque Regional Airport can watch the World Series on his or her mobile device 105 via WiFi without incurring any data plan or bandwidth charges. As will be recognized, a variety of other approaches and techniques can be used to adapt to various needs and circumstances.

IV. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for wirelessly providing at least one transcoded broadcast to mobile devices, the method comprising:

receiving, via a distribution device, an over-the-air broadcast from a broadcast system, wherein the over-the-air broadcast (a) is associated with a broadcast area, (b) is in an over-the-air broadcast format, and (c) comprises at least one television broadcast;

transcoding, via the distribution device, the over-the-air broadcast in the over-the-air broadcast format to a transcoded broadcast in a transcoded broadcast format; and wirelessly broadcasting, via the distribution device, the transcoded broadcast to a plurality of mobile devices located within a wireless broadcast range, wherein the wireless broadcast range is within the broadcast area.

2. The method of claim 1 further comprising authenticating the distribution device as being associated with the broadcast area.

3. The method of claim 1, wherein wirelessly broadcasting the transcoded broadcast is via WiFi.

4. The method of claim 1, wherein wirelessly broadcasting the transcoded broadcast comprises encrypting the transcoded broadcast.

5. The method of claim 1, wherein the broadcast area is selected from the group consisting of a designated market area, a zip code, a block group, and a government-established area.

6. An apparatus comprising at least one processor and at least one memory including computer program code, the at least one memory and the computer program code configured to, with the processor, cause the apparatus to at least:
receive an over-the-air broadcast from a broadcast system, wherein the over-the-air broadcast (a) is associated with a broadcast area, (b) is in an over-the-air broadcast format, and (c) comprises at least one television broadcast;
transcode the over-the-air broadcast in the over-the-air broadcast format to a transcoded broadcast in a transcoded broadcast format; and
wirelessly broadcast the transcoded broadcast to a plurality of mobile devices located within a wireless broadcast range, wherein the wireless broadcast range is within the broadcast area.

7. The apparatus of claim 6, wherein the memory and computer program code are further configured to, with the processor, cause the apparatus to authenticate the distribution device as being associated with the broadcast area.

8. The apparatus of claim 6, wherein wirelessly broadcasting the transcoded broadcast is via WiFi.

9. The apparatus of claim 6, wherein wirelessly broadcasting the transcoded broadcast comprises encrypting the transcoded broadcast.

10. The apparatus of claim 6, wherein the broadcast area is selected from the group consisting of a designated market area, a zip code, a block group, and a government-established area.

11. A computer program product for providing at least one transcoded broadcast to mobile devices, the computer program product comprising at least one non-transitory computer-readable storage medium having computer-readable program code portions stored therein, the computer-readable program code portions comprising:
an executable portion configured to receive an over-the-air broadcast from a broadcast system, wherein the over-the-air broadcast (a) is associated with a broadcast area, (b) is in an over-the-air broadcast format, and (c) comprises at least one television broadcast;
an executable portion configured to transcode the over-the-air broadcast in the over-the-air broadcast format to a transcoded broadcast in a transcoded broadcast format; and
an executable portion configured to wirelessly broadcast the transcoded broadcast to a plurality of mobile devices located within a wireless broadcast range, wherein the wireless broadcast range is within the broadcast area.

12. The computer program product of claim 11 further comprising an executable portion configured to authenticate the distribution device as being associated with the broadcast area.

13. The computer program product of claim 11, wherein wirelessly broadcasting the transcoded broadcast is via WiFi.

14. The computer program product of claim 11, wherein wirelessly broadcasting the transcoded broadcast comprises encrypting the transcoded broadcast.

15. The computer program product of claim 11, wherein the broadcast area is selected from the group consisting of a designated market area, a zip code, a block group, and a government-established area.

16. A method for wirelessly providing transcoded broadcasts to mobile devices, the method comprising:
receiving, via a distribution device, a plurality of over-the-air broadcasts from respective broadcast systems, wherein each of the plurality of over-the-air broadcasts (a) is associated with a broadcast area, (b) is in an over-the-air broadcast format, and (c) comprises at least one television broadcast;
transcoding, via the distribution device, each of the plurality of over-the-air broadcasts to a transcoded broadcast in a transcoded broadcast format; and
wirelessly broadcasting, via the distribution device, each of the plurality of transcoded broadcasts to a plurality of mobile devices located within a wireless broadcast range, wherein the wireless broadcast range is within the broadcast area.

17. The method of claim 16 further comprising authenticating the distribution device as being associated with the broadcast area.

18. The method of claim 16, wherein wirelessly broadcasting each of the plurality of transcoded broadcasts is via WiFi.

19. The method of claim 16, wherein wirelessly broadcasting each of the plurality of transcoded broadcasts comprises encrypting each of the plurality of transcoded broadcasts.

20. The method of claim 16, wherein the broadcast area is selected from the group consisting of a designated market area, a zip code, a block group, and a government-established area.

21. An apparatus comprising at least one processor and at least one memory including computer program code, the at least one memory and the computer program code configured to, with the processor, cause the apparatus to at least:
receive a plurality of over-the-air broadcasts from respective broadcast systems, wherein each of the plurality of over-the-air broadcasts (a) is associated with a broadcast area, (b) is in an over-the-air broadcast format, and (c) comprises at least one television broadcast;
transcode each of the plurality of over-the-air broadcasts to a transcoded broadcast in a transcoded broadcast format; and
wirelessly broadcast each of the plurality of transcoded broadcasts to a plurality of mobile devices located within a wireless broadcast range, wherein the wireless broadcast range is within the broadcast area.

22. The apparatus of claim 21, wherein the memory and computer program code are further configured to, with the processor, cause the apparatus to authenticate the distribution device as being associated with the broadcast area.

23. The apparatus of claim 21, wherein wirelessly broadcasting each of the plurality of transcoded broadcasts is via WiFi.

24. The apparatus of claim 21, wherein wirelessly broadcasting each of the plurality of transcoded broadcasts comprises encrypting each of the plurality of transcoded broadcasts.

25. The apparatus of claim 21, wherein the broadcast area is selected from the group consisting of a designated market area, a zip code, a block group, and a government-established area.

26. A computer program product for wirelessly providing transcoded broadcasts to mobile devices, the computer program product comprising at least one non-transitory computer-readable storage medium having computer-readable program code portions stored therein, the computer-readable program code portions comprising:

an executable portion configured to receive a plurality of over-the-air broadcasts from respective broadcast systems, wherein each of the plurality of over-the-air broadcasts (a) is associated with a broadcast area (b) is in an over-the-air broadcast format, and (c) comprises at least one television broadcast;

an executable portion configured to transcode each of the plurality of over-the-air broadcasts to a transcoded broadcast in a transcoded broadcast format; and an executable portion configured to wirelessly broadcast each of the plurality of transcoded broadcasts to a plurality of mobile devices located within a wireless broadcast range, wherein the wireless broadcast range is within the broadcast area.

27. The computer program product of claim 26 further comprising an executable portion configured to authenticate the distribution device as being associated with the broadcast area.

28. The computer program product of claim 26, wherein wirelessly broadcasting each of the plurality of transcoded broadcasts is via WiFi.

29. The computer program product of claim 26, wherein wirelessly broadcasting each of the plurality of transcoded broadcasts comprises encrypting each of the plurality of transcoded broadcasts.

30. The computer program product of claim 26, wherein the broadcast area is selected from the group consisting of a designated market area, a zip code, a block group, and a government-established area.

* * * * *